UNITED STATES PATENT OFFICE 2,300,598

PROCESS OF PRODUCING BUTENE-2-DIOL-1,4 AND ITS SUBSTITUTION PRODUCTS

Richard Schnabel and Willi Schmidt, Ludwigshafen-on-the-Rhine, and Kurt Heintz, Heidelberg, Germany, assignors, by mesne assignments, to General Aniline & Film Corporation, New York, N. Y., a corporation of Delaware No Drawing. Application July 6, 1939, Serial No. 283,122. In Germany July 19, 1938

2 Claims. (Cl. 260—635)

The present invention relates to a process of producing butene-2-diol-1,4 and its substitution products.

When subjecting butine-2-diol-1,4 or its homologues to the action of hydrogen under increased pressure in the presence of colloidal palladium, even at room temperature, practically only butane-diol-1,4 is obtained. The other usual hydrogenation catalysts, as for example nickel, cobalt, copper, also yield mainly saturated diols when working in the liquid phase under the hydrogenation conditions usually in practice.

We have now found that butine-2-diol-1,4 and its substitution products of the formula:

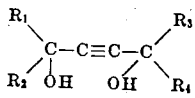

in which at least one of the radicles $R_1$, $R_2$, $R_3$ and $R_4$ stands for a hydrocarbon radicle, the other R's being hydrogen, can be converted in the liquid phase under increased hydrogen pressure into the corresponding butene-2-diol-1,4 compounds in good yields by using hydrogenation catalysts the activity of which has been reduced.

With all hydrogenation catalysts, which under normal conditions will fully hydrogenate the triple linkage of at least part of the butinediol an addition of carbon monoxide has proved suitable for this purpose. While for example nickel on carbon, finely divided cobalt, copper chromite catalysts, palladium on silicic acid gel, platinum on carbon, without the addition of carbon monoxide yield practically only butanediol-1,4 at high hydrogen pressures and normal or moderately elevated temperatures, the addition of carbon monoxide, for example of from 1 to 20 per cent of the amount of hydrogen, has the effect that good yields of butene-2-diol-1,4 are obtained with the same catalysts.

Similarly the activity of the catalyst may be reduced by applying it to carriers which are capable of reducing the activity thereof. Catalysts such as palladium on kieselguhr or cobalt, cobalt oxide, chromium oxide or copper oxide on bleaching earths thus yield butene-2-diol-1,4 in good yields because the said weakly acid carriers weaken the catalysts in their activity. On the contrary, for example, with nickel or platinum on carbon, butane-diol-1,4 is obtained as above described.

The activity of the catalysts may also be weakened by adding to the reaction liquid substances which reduce the activity. This method has proved especially suitable when using precious metals as catalysts. Small amounts of phosphoric acid, secondary sodium phosphate, boric acid, potassium thiocyanide, sodium carbonate and piperidine may be enumerated as substances reducing the activity without limiting our invention to the use of these particular substances.

Two or more of the said measures which weaken the activity of the catalyst in favor of the formation of butene-2-diol-1,4 may also be combined.

The temperatures suitable for the process are determined by the catalyst used. They usually lie below 200° C. A cobalt catalyst which would be very active under normal conditions may be used for example satisfactorily even at ordinary temperature, while oxidic catalysts, as for example copper chromite or cobalt oxide on bleaching earths require a reaction temperature of about 150° C. Generally speaking temperatures of from 10° to 150° C. are favorable.

In order to obtain high yields per unit of space and time, it is preferable to employ pressures of 100 atmospheres or more, as for example 250 atmospheres, although the hydrogenation also takes place at a useful speed at 50 or 10 atmospheres. The process may be carried out discontionuously or continuously.

The following examples will further illustrate how this invention may be carried out in practice but the invention is not restricted to these examples. The parts are by weight.

Example 1

200 parts of a crude 33 per cent aqueous butine-2-diol-1,4 solution in which 0.2 part of potassium thiocyanide is dissolved are treated, after the addition of 10 parts of finely divided cobalt suspended in 20 parts of water, in a high pressure autoclave at room temperature while stirring with hydrogen under a pressure of 100 atmospheres until the pressure remains constant. The catalyst is filtered off from the reaction liquid and the water evaporated from the latter. Practically pure butene-2-diol-1,4 is thus obtained in a yield of 80 per cent of the theoretical yield. It boils at from 129° to 130° C. under a pressure of 13 millimeters (mercury gauge). By working with the same catalyst without the addition of potassium thiocyanide in the presence of 5 atmospheres of carbon monoxide, pure butene-2-diol-1,4 is also obtained in a yield of 82 per cent of the theoretical yield.

If the activity of the cobalt catalyst be not weakened, butine-2-diol-1,4 is hydrogenated at ordinary temperature completely to butane-diol-1,4.

Butene-2-diol-1,4 may be obtained in good yields from a solution of pure butine-2-diol-1,4 in 80 parts of methanol, to which a suspension of 5 parts of finely divided cobalt in 10 parts of water has been added. This mixture is charged into a pressure-tight vessel. After pressing in 5 atmospheres of carbon monoxide, the mixture is treated with hydrogen under a pressure of 150 atmospheres at 150° C. until hydrogen is no longer absorbed.

Example 2

10 parts of a copper chromite catalyst are added to 200 parts of a crude 50 per cent aqueous butine-2-diol-1,4 solution and charged into a pressure vessel. After pressing in 5 atmospheres of carbon monoxide the mixture is treated with hydrogen under a pressure of 120 atmospheres at 150° C. while stirring until hydrogen is no longer absorbed. The catalyst may be used repeatedly. After evaporating the water, the residue yields a completely pure butene-2-diol-1,4 (boiling point 130° C. at 13 millimeters) in a good yield. With a copper chromite catalyst which has not been weakened, in its activity there is obtained under the same conditions a mixture of butene-2-diol-1,4 and mainly butane-diol-1,4.

Example 3

0.3 part of secondary sodium phosphate is dissolved in 200 parts of a 20 per cent aqueous crude butine-2-diol-1,4 solution. After adding 10 parts of a catalyst containing 0.2 parts of platinum on 99.8 parts of carbon, it is hydrogenated in a stirring autoclave at 150° C. and a hydrogen pressure of 150 atmospheres until the absorption of hydrogen ceases. Practically pure butene-2-diol-1,4 is obtained in a yield of 80 per cent of the theoretical yield.

If 0.15 parts of boric acid or 3 parts of piperidine be added to the butine-2-diol-1,4 solution as the weakening addition for the catalyst instead of 0.3 part of secondary sodium phosphate, butene-2-diol-1,4 is also obtained in a good yield.

An addition of 5 atmospheres of carbon monoxide also effects the formation of a very pure butene-2-diol-1,4 in a yield of about 90 per cent of the theoretical yield. If the hydrogenation be carried out without weakening the activity of the catalyst, pure butane-diol-1,4 is obtained.

Butene-2-diol-1,4 is obtained in 70 per cent of the theoretical yield when working in the following manner: 100 parts of an aqueous 30 per cent solution of butine-2-diol-1,4 are charged into a pressure-tight vessel. After adding 5 parts of the platinum catalyst referred to above, carbon monoxide of 2 atmospheres pressure is pressed in, and then hydrogen of 10 atmospheres pressure is introduced at 190° C. until it is no longer absorbed.

Example 4

200 parts of a 33 per cent aqueous butine-2-diol-1,4 solution are hydrogenated in the usual way in the presence of 10 parts of a catalyst containing 20 parts of cobalt on 80 parts of bleaching earth, at 100° C. under a hydrogen pressure of 120 atmospheres until hydrogen is no longer absorbed. A very pure butene-2-diol-1,4 is obtained in a yield of 75 per cent of the theoretical yield.

Metal oxides which are applied to bleaching earths, such as cobalt oxide, or mixtures of chromium oxide and copper oxide, also hydrogenate butine-2-diol-1,4 in good yields to pure butene-2-diol-1,4.

Example 5

1 liter of an about 33 per cent crude solution of butine-2-diol-1,4 (obtained from formaldehyde and acetylene) is first shaken with 20 grams of animal carbon and then filtered. The whole is then treated in a pressure vessel, after adding 50 grams of a catalyst obtained by applying 0.2 gram of palladium to 1 liter of pure kieselguhr, with hydrogen under a pressure of about 20 atmospheres and at 100° C. until hydrogen is no longer absorbed, which is the case after from about 10 to 20 hours. The filtered catalyst can be used repeatedly. After careful evaporation of the water, butene-2-diol-1,4 having a boiling point of from 107° to 110° C. at a pressure of from 1.0 to 1.4 millimeters is obtained in a very good yield.

For the purpose of comparison, the following is a description of the hydrogenation of butine-2-diol-1,4 with colloidal palladium.

A solution of 4.018 grams of pure butine-2-diol-1,4 in 35 cubic centimeters of methanol is charged into a shaking vessel and, after scavenging with nitrogen until all air has been expelled, a mixture of 1 cubic centimeter of a 5 per cent aqueous gum arabic solution and 5 cubic centimeters of a 1 per cent palladious chloride solution is added. While shaking at room temperature, hydrogen is led from a gasometer into the mixture until hydrogen is no longer absorbed. The absorption of hydrogen amounts at 23° C. and a barometric height of 752.3 millimeters to 2,370 cubic centimeters in 12.5 hours, corresponding to 2098.5 cubic centimeters of hydrogen under normal conditions, while for the absorption of 2 molecular proportions of hydrogen, 2045 cubic centimeters is the calculated amount. Thus 2 molecular proportions of hydrogen have been absorbed, the butine-2-diol-1,4 being converted into butane-diol-1,4.

What we claim is:

1. A process for the production of butene-2-diol-1,4 which consists in treating in the liquid phase with a mixture of hydrogen and carbon monoxide in which hydrogen preponderates by mols under superatmospheric pressure butine-2-diol-1,4 in the presence of a hydrogenation catalyst until hydrogen is no longer absorbed.

2. A process for the production of butene-2-diol-1,4 and its substitution products which consists in treating in the liquid phase with hydrogen under superatmospheric pressure a member of the group consisting of butine-2-diol-1,4 and butine-2-diol-1,4 substituted in at least one of the 1- and 4-positions by a hydrocarbon radical in the presence of a hydrogenation catalyst and in the presence of carbon monoxide until hydrogen is no longer absorbed.

RICHARD SCHNABEL.
WILLI SCHMIDT.
KURT HEINTZ.